US006941553B2

(12) United States Patent
Eisler et al.

(10) Patent No.: US 6,941,553 B2
(45) Date of Patent: Sep. 6, 2005

(54) HYPERTEXT CONCEPT NOTATION FOR DYNAMICALLY CONSTRUCTING A SENTENCE TO RESPOND TO A USER REQUEST

(75) Inventors: Craig G. Eisler, Redmond, WA (US); Brian C. Roundtree, Kirkland, WA (US)

(73) Assignee: Action Engine Corporation, Redmond, WA (US)

( * ) Notice: Subject to any disclaimer, the term of this patent is extended or adjusted under 35 U.S.C. 154(b) by 712 days.

(21) Appl. No.: 09/783,611

(22) Filed: Feb. 15, 2001

(65) Prior Publication Data

US 2002/0002575 A1 Jan. 3, 2002

Related U.S. Application Data

(63) Continuation-in-part of application No. 09/783,215, filed on Feb. 15, 2000.

(60) Provisional application No. 60/182,330, filed on Feb. 14, 2000.

(51) Int. Cl.[7] .................... G06F 17/00

(52) U.S. Cl. .................... 718/1; 707/10

(58) Field of Search .................... 706/59–62; 705/26; 707/5, 6; 395/762

(56) References Cited

U.S. PATENT DOCUMENTS

| | | | | |
|---|---|---|---|---|
| 4,783,800 A | | 11/1988 | Levine | 379/67 |
| 4,893,329 A | | 1/1990 | O'Brien | 379/88 |
| 5,289,531 A | | 2/1994 | Levine | 379/93 |
| 5,297,144 A | | 3/1994 | Gilbert et al. | 370/95.2 |
| 5,327,144 A | | 7/1994 | Stilp et al. | 342/387 |
| 5,355,472 A | | 10/1994 | Lewis | 395/600 |
| 5,467,388 A | | 11/1995 | Redd, Jr. et al. | 379/196 |
| 5,479,476 A | | 12/1995 | Finke-Anlauff | 379/58 |
| 5,544,288 A | | 8/1996 | Morgan et al. | 395/157 |
| 5,629,678 A | | 5/1997 | Gargano et al. | 340/573 |
| 5,652,789 A | | 7/1997 | Miner et al. | 379/201 |
| 5,652,867 A | | 7/1997 | Barlow et al. | 395/500 |
| 5,696,497 A | | 12/1997 | Mottier et al. | 340/825.44 |
| 5,737,491 A | | 4/1998 | Allen et al. | 395/2.79 |
| 5,774,874 A | | 6/1998 | Veeneman et al. | 705/27 |
| 5,809,317 A | * | 9/1998 | Kogan et al. | 715/501.1 |
| 5,815,830 A | * | 9/1998 | Anthony | 707/6 |
| 5,838,315 A | | 11/1998 | Craycroft et al. | 345/333 |
| 5,844,522 A | | 12/1998 | Sheffer et al. | 342/457 |
| 5,845,219 A | | 12/1998 | Henriksson | 455/567 |
| 5,862,325 A | | 1/1999 | Reed et al. | 395/200.31 |
| 5,872,841 A | | 2/1999 | King et al. | 379/209 |
| 5,893,127 A | | 4/1999 | Tyan et al. | 707/513 |
| 5,895,471 A | | 4/1999 | King et al. | 707/104 |
| 5,903,870 A | | 5/1999 | Kaufman | 704/275 |
| 5,930,700 A | | 7/1999 | Pepper et al. | 455/414 |

(Continued)

OTHER PUBLICATIONS

Marshall, C., Exploring Representational Problems Using Hypertext, 1987, Proceeding of the ACM Conference on Hypertext, pp. 253–268.*

*Primary Examiner*—Anthony Knight
*Assistant Examiner*—Michael B. Holmes
(74) *Attorney, Agent, or Firm*—Schwabe, Williamson & Wyatt, P.C.

(57) ABSTRACT

Use of concepts to dynamically query a user and construct a sentence for responding to a user request. The use of hypertext concept notation permits the linking of related concepts through concept identifiers. The constructed sentence can be dynamically changed by a user selecting a representation of a concept within the sentence, either a complete sentence or one in the process of being constructed. The data for the selected concept can be updated and the new data inserted into the sentence using the links provided by the concept identifiers.

26 Claims, 8 Drawing Sheets

U.S. PATENT DOCUMENTS

| | | | | |
|---|---|---|---|---|
| 5,931,907 | A | 8/1999 | Davies et al. | 709/218 |
| 5,946,687 | A | 8/1999 | Gehani et al. | 707/10 |
| 5,953,393 | A | 9/1999 | Culbreth et al. | 379/88.25 |
| 5,963,949 | A | 10/1999 | Gupta et al. | 707/100 |
| 5,966,655 | A | 10/1999 | Hardouin | 455/418 |
| 5,970,449 | A | 10/1999 | Alleva et al. | 704/235 |
| 5,983,200 | A | 11/1999 | Slotznick | 705/26 |
| 5,991,723 | A | 11/1999 | Duffin | 704/260 |
| 6,006,221 | A | 12/1999 | Liddy et al. | 707/5 |
| 6,006,225 | A | 12/1999 | Bowman et al. | 707/5 |
| 6,021,181 | A | 2/2000 | Miner et al. | 379/88.23 |
| 6,029,135 | A | 2/2000 | Krasle | 704/275 |
| 6,038,534 | A | 3/2000 | Richards | 704/275 |
| 6,047,053 | A | 4/2000 | Miner et al. | 379/201 |
| 6,058,415 | A | 5/2000 | Polcyn | 709/200 |
| 6,061,718 | A | 5/2000 | Nelson | 709/206 |
| 6,064,980 | A | 5/2000 | Jacobi et al. | 705/26 |
| 6,065,120 | A | 5/2000 | Laursen et al. | 713/201 |
| 6,073,005 | A | 6/2000 | Raith et al. | 455/404 |
| 6,088,731 | A | 7/2000 | Kiraly et al. | 709/229 |
| 6,167,253 | A | 12/2000 | Farris et al. | 455/412 |
| 6,173,316 | B1 | 1/2001 | De Boor et al. | 709/218 |

* cited by examiner

HYPERTEXT CONCEPT NOTATION FOR DYNAMICALLY CONSTRUCTING A SENTENCE TO RESPOND TO A USER REQUEST

REFERENCE TO RELATED APPLICATIONS

The present application is a continuation-in-part of the following: U.S. patent application Ser. No. 09/783,215 filed Feb. 15, 2000, with inventor Brian C. Roundtree and entitled "Airline Flight Departure and Arrival Prediction Based Upon Historical and Real-Time Data"; U.S. patent application Ser. No. 09/616,468 filed Jul. 14, 2000, with inventor Brian C. Roundtree and entitled "Web-Based Personal Assistant Communication System"; U.S. patent application Ser. No. 09/616,490 filed Jul. 14, 2000, with inventor Brian Roundtree and entitled "Web-Based Personal Assistant User Interface System"; U.S. patent application Ser. No. 09/615,660 filed Jul. 14, 2000, with inventor Brian Roundtree and entitled "Web-Based Personal Assistant Communication Method"; U.S. patent application Ser. No. 09/658,399 filed Sep. 8, 2000, with inventors Cristiano L. S. Pierry and Brian C. Roundtree and entitled "System for Secure Electronic Transactions Using Unique Identifiers for Order-Related Information"; U.S. patent application Ser. No. 09/658,406 filed Sep. 8, 2000, with inventors Keldon V. Rush and Brian C. Roundtree and entitled "System for Converting Textual Concepts to Interactive Audio and Audio/Visual Presentations"; U.S. patent application Ser. No. 09/658,407 filed Sep. 8, 2000, with inventor Brian C. Roundtree and entitled "System for Obtaining Service-Related Information for Local Interactive Wireless Devices"; U.S. patent application Ser. No. 09/658,467 filed Sep. 8, 2000, with inventor Brian C. Roundtree and entitled "Voice-to-Concept Conversion System"; U.S. patent application Ser. No. 09/783,608 filed Feb. 15, 2001, with inventors Brian C. Roundtree and Craig G. Eisler and entitled "Rendering Data Using Rendering Instructions Based Upon Historical and Real-Time Data"; U.S. patent application Ser No. 09/783,609 filed Feb. 15, 2001, with inventor Brian C. Roundtree and entitled "Automated Reservation and Appointment System Using Interactive Voice Recognition"; U.S. patent application Ser. No. 09/783,616 filed Feb. 15, 2001, with inventors Cristiano L. S. Pierry and Brian C. Roundtree and entitled "Automated Alert State Change of User Devices for Time-Based and Location Based Events". All of the foregoing claim the benefit of priority of U.S. Provisional Patent Application No. 60/182,330 filed Feb. 14, 2000, with inventor Brian C. Roundtree and entitled "Web-Based Personal Assistant Communication Program and Method Therefor". The present application is related to U.S. patent application Ser. No. 09/658,468 filed Sep. 8, 2000, with inventors Cristiano L. S. Pierry and Brian C. Roundtree and entitled "On-Line Service Provider Sign-Up System" and U.S. patent application Ser. No. 09/783,610 filed Feb. 15, 2001, with inventors Brian C. Roundtree and Craig G. Eisler and entitled "Assembling Personal Information of a Targeted Person Based Upon Third-Party Information and a Request Purpose". The subject matter of all of the foregoing applications is incorporated herein by reference as if fully set forth.

FIELD OF THE INVENTION

The present invention relates to an apparatus and method for using concepts and related identifiers to dynamically construct a sentence for responding to a user request.

BACKGROUND OF THE INVENTION

Wireless devices, such as cell phones and personal digital assistants (PDAs), are becoming more commonly used and have the potential for communication over the Internet in addition to traditional telephone networks. The Internet communication with these devices permits users to obtain services and other related information using wireless communication with the devices. For example, a user can download content from the world wide web on the Internet using a cell phone and have the information displayed on the display panel of the cell phone. Therefore, in addition to using the cell phone for voice communication, the user can obtain content over the Internet concerning, for example, services available from service providers. The user can also execute transactions over the Internet using the cell phone or other wireless device. For example, the user can make electronic purchases for good or services, analogous to how users can make transactions over the Internet using a personal computer having a connection to the Internet.

Many wireless devices, however, provide for limited ways to enter information for communications over the Internet. Cell phones, for example, typically have only a key pad in addition to a microphone, making entry of textual information slow and inconvenient. Other devices, such as PDAs, may have even more limited ways to enter textual information. Therefore, these devices do not typically provide the same ease of interacting over the Internet as provided by a personal computer having a keyboard and cursor-control device for easy and convenient "point and click" selection of content displayed in web pages. These devices may also be limited in how information can be displayed. Wireline devices, such as conventional phones, provide for even more limited interaction over the Internet.

Also, when using these user devices to execute the transactions, the information available through the transactions is often limited. A user request for content often results in generic content potentially applicable to many situations other than the particular situation of the user. For example, a user may want information about purchasing gifts for others or information about services available such as travel-related information. In response to a request for such information, the user may be provided with information about gifts for generic categories and other information for general travel-related services. Without targeting the information to the user's situation, the information may not have much value to the user.

Accordingly, a need exists for increased options and versatility for user's having wireless devices or wireline devices to interact and make transactions over the Internet, for increased versatility to request service or make transactions with service providers, and for obtaining more information targeted to a user's particular situation or request.

SUMMARY OF THE INVENTION

A method and apparatus consistent with the present invention dynamically construct a sentence relating to a user request. An indication of concepts is received from a user, and related queries are selected to present to the user based upon the concepts. A sentence relating to the user request is dynamically constructed using the concepts. A user can select concepts within the sentence after or during its construction, and the sentence is dynamically updated based upon those selected concepts.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Introduction

Figure 1:
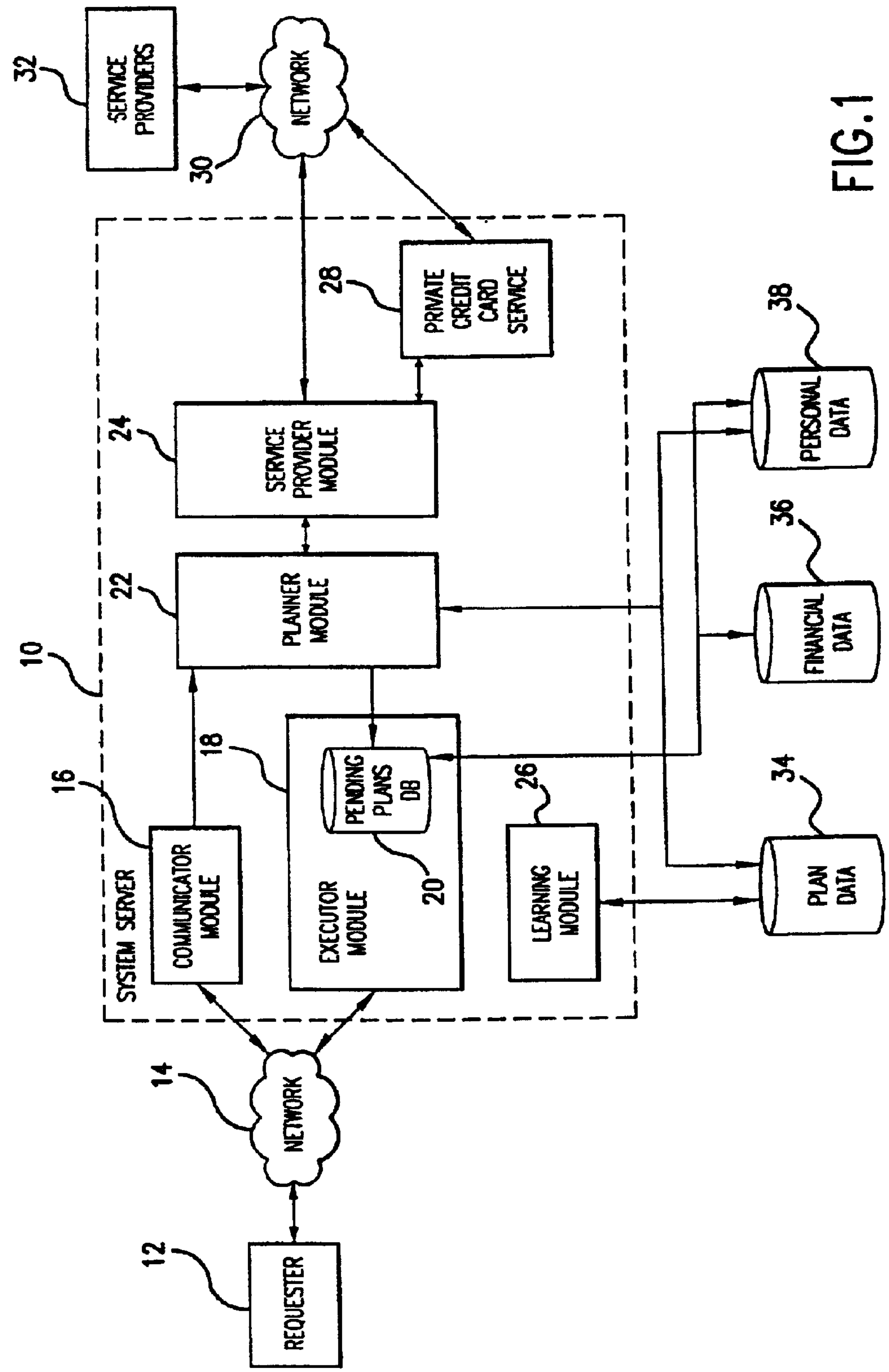
FIG. 1 is a diagram of a system for processing requests for service.

Embodiments consistent with the present invention provide various features for a web-based electronic personal assistant, as described in the web-based personal assistance applications identified above. The electronic personal assistant is implemented with a system server that the receives requests from users through wireless or wireline devices and processes the requests in order to provide the user with requested service or information. These features permit the user to interact with the system server in a variety of ways such as through a display on the device, a keyboard or keypad, or through voice interaction. The system server can present information to the user in a variety of ways as well, such as through audio communication or through information presented on a display with, for example, textual information, screens, or web pages presented with HyperText Markup Language (HTML).

The requests, as explained in the web-based personal assistance applications identified above, can include any request for service or information. For example, a user may request a meeting, and in response the system server queries the user to obtain information required to arrange the meeting and then automatically makes the arrangements. As another example, a user may request information concerning services in a particular geographic location or based upon other parameters, and the system server can query the user to determine the type of information requested, such as particular types of retail establishments, and provide the information to the user. As another example, a user may request to purchase goods or services, or make reservations for services, and in response the system server queries the user to determine the type of goods or services desired as well as other information such as a desired price. Based upon that information, the system server automatically makes the purchase for the user. For the reservations example, the system server can query the user to determine information required to make the reservations for the user. For any request, the system server can access user preferences to obtain information required or useful to process the request, such as the user's credit card information and shipping address.

In addition, the system server can automatically notify the user of particular information. The system server typically maintains a database of preferences for the users in order to help process the requests. It also maintains a concept database and uses the concepts in order to retrieve and construct queries, such as text fragments, for the user. The use of only text fragments, for example, saves transmission time in comparison to transmission of graphical information over a network; alternatively, graphics can be used in addition to the text fragments.

Based upon the type of request, and potentially user preferences, the system server selects the appropriate queries from the concept database to obtain information to process the request. Upon completion of the processing, the system server can present to the user a sentence constructed from the related concepts in order to confirm the request. It can also use the sentence to document the request, retrieve the appropriate resources for it, and otherwise fulfill the request. This process, and the use of these concepts and the structure for a concept database, are further described in the web-based personal assistance applications identified above.

The system server can also cross-reference the concept database with a service provider database. In order to fulfill requests, the system server can access a database identifying available service providers for the request. At the end of each string of concepts in the concept database, that database can specify a link or pointer to the relevant service providers in the service provider database. For example, if the request is for a meeting, once the system server has all the relevant information as constructed from the concepts, the concept for the location of the meeting can include a pointer or link to the establishments proximate the location and available to provide food for the meeting. Therefore, information for relevant service providers can be associated with the appropriate concepts in the concept database.

Request Processing

FIG. 1 is a diagram of a system for fulfilling a request for service. The system includes a system server 10 for processing a request transmitted from a requestor 12 through a network 14 such as the Internet or other wireline or wireless network. System server 10 includes several software modules for processing the request from requestor 12. A communicator module 16 manages an interface for the communications with requester 12 over network 14. Communicator module 16 receives the request and provides necessary formatting and other processing for transmitting it to a planner module 22.

Planner module 22 interacts with a service provider module 24 in order to obtain the resources for fulfilling the request. In particular, service provider module 24 interacts over a network 30, such as the Internet or a phone network, with one or more service providers 32 in order to obtain services to fulfill the request. Service provider module 24 provides for communication and data conversion for the interaction, while planner module 22 manages processing of the request and interacts with various databases for processing the request. A private credit card service module 28 can provide for secure order processing of the request to help safeguard users' personal information such as credit card numbers.

Once the planner module 22 has obtained the resources for the request, it communicates information to fulfill the request to an executor module 18. Executor module 18 includes a pending plan database 20 for storing and managing resources and other information to fulfill the request. Executor module 18 thus communicates back over network 14 with requestor 12 to provide confirmation of the request and also to execute the request.

A learning module 26 can provide for fine-tuning plan data within a database 34 in order to more efficiently process requests, particularly from the same requestor. Other databases include a database 36 storing financial data accessed by executor module 18, and a database 38 storing personal data accessed by executor module 18 and planner module 22. The personal data can include an account for each user having a profile and preferences for the users, and the information can be indexed by a particular user identifier such as a phone number or code.

Table 1 illustrates a user account. As shown, the user accounts can include users' preferences for a wide variety of information such as for travel, dining, and other types of service providers. The user preferences can be continually updated and refined over time as the system server gathers more information concerning the user, and the system server can optionally use learning models for the refinements and use the preferences to make "smart choices" in processing users' requests. The information can be stored in a variety of ways such as in a relational database or with name-value pairs in Extensible Markup Language (XML).

TABLE 1

| | |
|---|---|
| user 1 identifier | data |
| contact | name, address |
| profile | user 1 characteristics |
| hotel information | user 1 hotel preferences |
| airline information | user 1 airline preferences |
| rental car information | user 1 rental car preferences |
| restaurant information | user 1 restaurant preferences |
| service provider preferences | user 1 service provider preferences |
| other category | user 1 preferences for the category |

Processing to fulfill the request is further explained in the web-based personal assistance applications identified above.

Network

Figure 2:
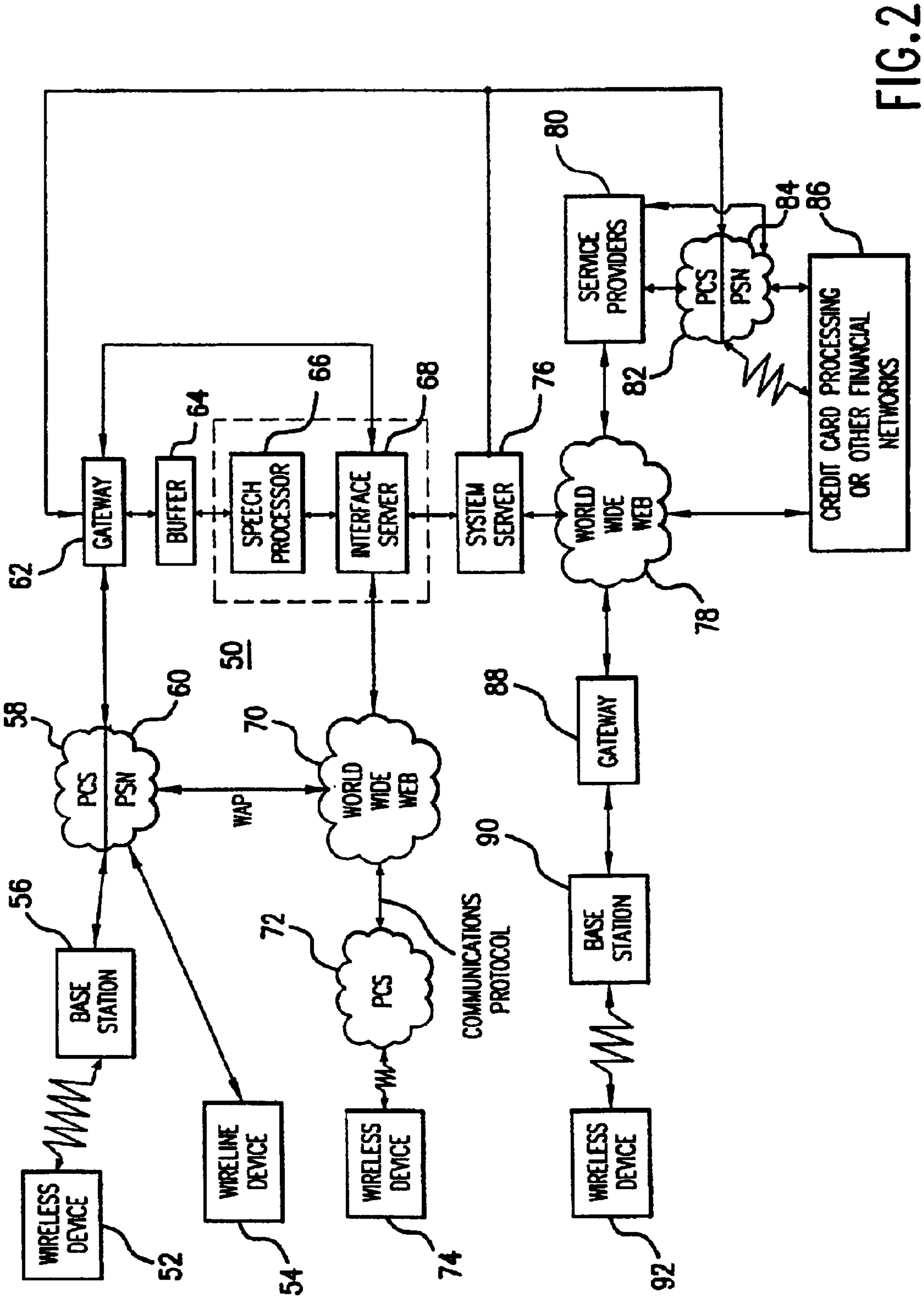
FIG. 2 is a diagram of a network for communicating with wireless and wireline devices and service providers to process requests for service.

FIG. 2 is a diagram of an exemplary network 50 illustrating interaction for receiving and processing requests from users such as requester 12. It illustrates how the system can receive requests through wireless and wireline transmission over conventional phone and cellular networks as well as the Internet or other computer networks. A requestor typically makes a request from a wireless or wireline device. The wireless devices include any device capable of wireless electronic communication and examples include the following: cellular phones; PDAs with wireless network access; wireless Internet appliances; personal computers (including desktop, laptop, notebook, and others) with wireless network access; and personal computers with microphones, speakers, and circuitry for permitting wireless phone calls. The wireline devices include any device capable of electronic wireline communication and examples include the following: conventional phones; PDAs with wireline network access; Internet appliances; personal computers (including desktop, laptop, notebook, and others) with wireline network access; and personal computers with microphones, speakers, and circuitry for permitting wireline phone calls.

A wireless device 52, for example, can interact through wireless transmission with a base station 56 for communication over a personal communication system (PCS) 58. A request may also be made from a wireline device 54 communicating over a public switched telephone network (PSN) 60. Systems for wireless and wireline communication, includes a PCS and PSN, are known in the art.

Communications through networks 58 and 60 are transmitted through a gateway 62 and potentially a buffer 64 to a speech processor 66 for performing processing of audio or particular types of communications, such as for voice-to-text conversion. Also, the communication may occur directly from gateway 62 to an interface server 68. Interface server 68 controls gateway 62, and it provides an interface between a system server 76 and gateway 62, speech processor 66, and the world wide web 70.

System server 76 corresponds with system server 10 in FIG. 1 to process user requests. Interface server 68 provides the data conversion and processing for transferring data to and from system server 76. As shown by the dashed line, speech processor 66 and interface server 68 can be implemented with the same physical machine or with different machines. Also, system server 76 can be implemented with one or more physical machines and can also be programmed to implement the functions of speech processor 66 and interface server 68.

In addition to receiving requests over networks 58 and 60, interface server 68 can receive a request over the world wide web 70. In particular, a wireless device 74 can interact through wireless communication with a PCS 72, which communicates over the world wide web 70 through a communication protocol such as, for example, the wireless application protocol (WAP). The WAP for communications over the Internet is known in the art.

System server 76 can communicate over the world wide web 78 with various service provides 80 to fulfill requests. In addition, system server 76 can communicate with credit card processing or other financial networks 86 in order to provide financial processing for fulfilling requests. Networks 86 can include known networks, including banking networks, for processing credit card transactions. As shown, service providers 80 and financial networks 86 can also send and receive communications through a PCS 82 and PSN 84.

System server 76 can communicate directly over the world wide web 78 to a gateway 88 and base station 90 in order to provide communication directly with a wireless device 92. Also as shown, communications can occur from system server 76 back through interface server 68 and speech processor 66 to the end user wireless devices 52 and 74 and wireline device 54; system server 76 can also communicate directly with gateway 62, as shown. Those communications can provide, for example, confirmation of a request or information responsive to a request.

Network 50 illustrates fundamental hardware components for communications over the various types of networks shown. As known in the art, network 50 can include additional components and can also include components for providing services known in the art with respect to phone calls. For example, it can include a caller ID service to provide system server 76 with the phone number of the user's wireless or wireline device originating a communication. Also, network 50 can include other means for communication of data such as through satellite transmission. For transmission over the Internet, network 50 can use Transmission Control Protocol/Internet Protocol (TCP/IP) or other protocols.

Server Components

Figure 3:
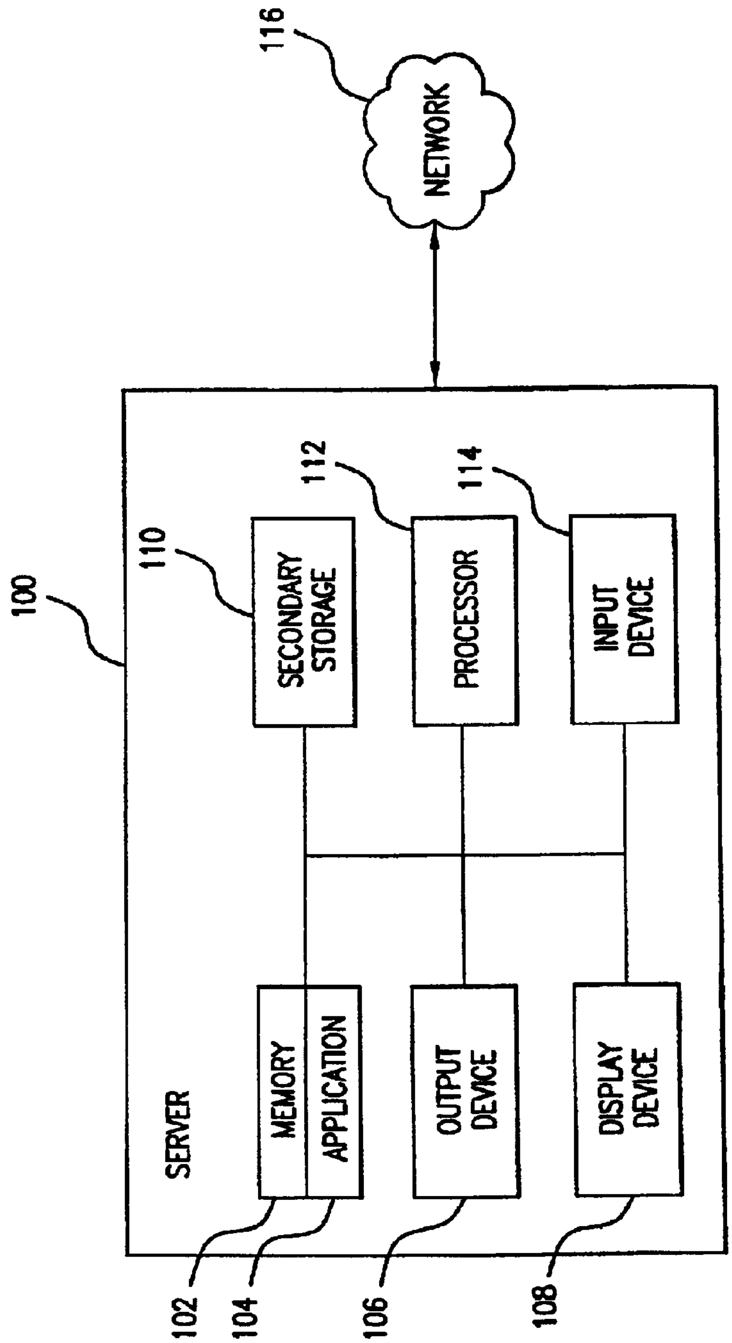
FIG. 3 is a diagram of exemplary components of a server for processing requests for service.

FIG. 3 depicts a server 100 illustrating exemplary hardware components of system server 10 and other machines used by the system, such as speech processor 66 and interface server 68. Server 100 includes a connection with a network 116 such as the Internet or other type of computer or phone networks, which may correspond with the networks shown in FIGS. 1 and 2. Server 100 typically includes a memory 102, a secondary storage device 110, a processor 112, an input device 114, a display device 108, and an output device 106.

Memory 102 may include random access memory (RAM) or similar types of memory, and it may store one or more applications 104 for execution by processor 112. Applications 104 may correspond with software modules to perform processing for the functions described below. Secondary storage device 110 may include a hard disk drive, floppy disk drive, CD-ROM drive, or other types of non-volatile data storage, and it may correspond with the various databases shown in FIG. 1. Processor 112 may execute applications or programs stored in memory 102 or secondary storage 110, or received from the Internet or other network 116. Input device 114 may include any device for entering information into server 100, such as a keyboard, key pad, cursor-control device, touch-screen (possibly with a stylus), or microphone. Display device 108 may include any type of device for presenting visual information such as, for example, a computer monitor, flat-screen display, or display panel. Output device 106 may include any type of device for presenting a hard copy of information, such as a printer, and other types of output devices include speakers or any device for providing information in audio form. Server 100 can possibly include multiple input devices, output devices, and display devices.

Although server 100 is depicted with various components, one skilled in the art will appreciate that this server can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling server 100 to perform a particular method.

Wireless Device Components

Figure 4:
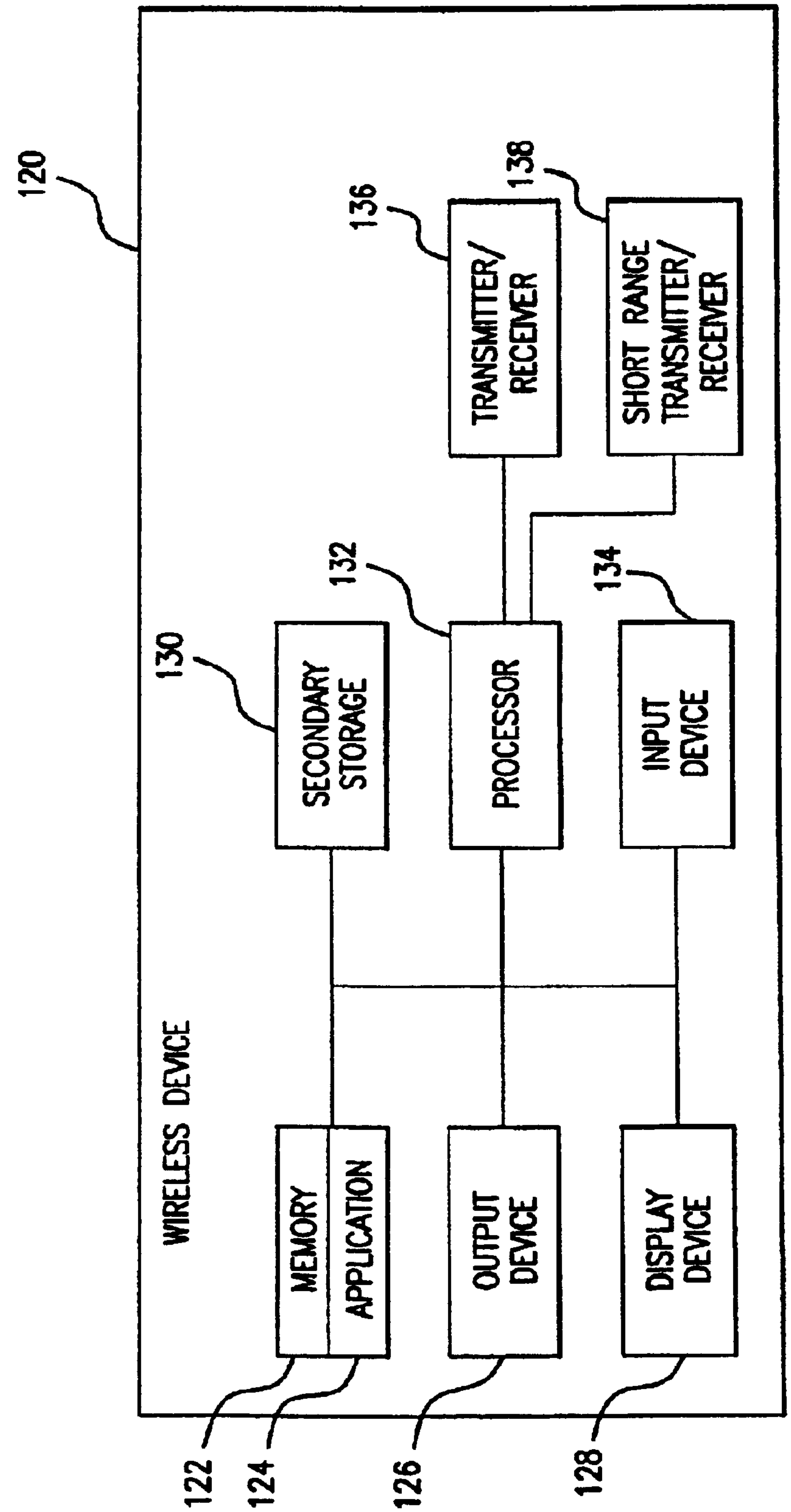
FIG. 4 is a diagram of exemplary components of a wireless device.

FIG. 4 illustrates exemplary hardware components of a wireless device 120, which may correspond with the exemplary wireless devices identified above. Wireless device 120 typically includes a memory 122, a secondary storage device 130, a processor 132, an input device 134, a display device 128, an output device 126, a transmitter/receiver 136, and a short range transmitter/receiver 138.

Memory 122 may include RAM or similar types of memory, and it may store one or more applications 124 for execution by processor 132. Applications 124 may correspond with software modules to perform processing for the functions described below, and they may also include web browser programs for retrieving and displaying content from the Internet. Secondary storage device 130 may include a hard disk drive, floppy disk drive, CD-ROM drive, or other types of non-volatile data storage such as a ROM. Processor 132 may execute applications or programs stored in memory 122 or secondary storage 130. Input device 134 may include any device for entering information into wireless device 120, such as a keyboard, key pad, cursor-control device, touch-screen (possibly with a stylus), or microphone. Wireless device 120 can include multiple input devices; for example, it can include both a microphone and key pad for a cell phone. Display device 128 may include any type of device for presenting visual information such as, for example, a computer monitor, flat-screen display, or display panel. Output device 126 typically includes a speaker for providing information in audio form. It can also include a device for providing a hard copy of information such as a printer, or provide a port for a connection to a printer. Wireless device 120 can possibly include multiple input devices, output devices, and display devices.

Transmitter/receiver 136 provides for wireless communication with phone networks or computer networks such as is shown in FIGS. 1 and 2. Transmitter/receiver 136 can be implemented with known RF transmitters and receivers for providing cellular transmission between wireless device 120 and base stations such as base stations 56 and 90, or it can be implemented with a wireless transmitter/receiver for other types of communication such as a satellite transmission.

Short range transmitter/receiver 138 provides for wireless short range communication with other wireless devices, and it can be implemented with transmitters and receivers that operate according to the IEEE standard 802.11 for local wireless networks or according to the standard referred to as the Bluetooth™ technology for direct wireless communication between local interactive wireless devices; that technology is explained in, for example, the Specification of the Bluetooth System, Core, v1.0 B, Dec. 1, 1999 and the Specification of the Bluetooth System, Profiles, v1.0 B, Dec. 1, 1999, both of which are incorporated herein by reference.

In addition, even if a wireless device does not contain short range transmitter/receiver 138, technology exists to obtain an approximate geographic location of certain wireless devices. In particular, using multiple base stations the signal from a cellular phone, for example, can be triangulated in order to obtain an approximate geographic location of the cellular phone, including an indication of its vertical (altitude) location.

Although wireless device 120 is depicted with various components, one skilled in the art will appreciate that this wireless device can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling wireless device 120 to perform a particular method.

Exemplary hardware components for wireline devices, such as the examples provided above, can include the same components as wireless device 120 except without the transmitter/receiver 136 and the short range transmitter/receiver 138.

Hypertext Concept Notation

The use of concepts to construct a sentence for responding to a user request is described above in the related applications. The use of hypertext concept notation permits the linking of related concepts through concept identifiers. Therefore, a sentence can be dynamically changed by a user selecting a concept within the sentence, either complete or in the process of being constructed. The data for the selected concept can be updated and the new data inserted into the sentence using concept identifiers.

Figure 5:
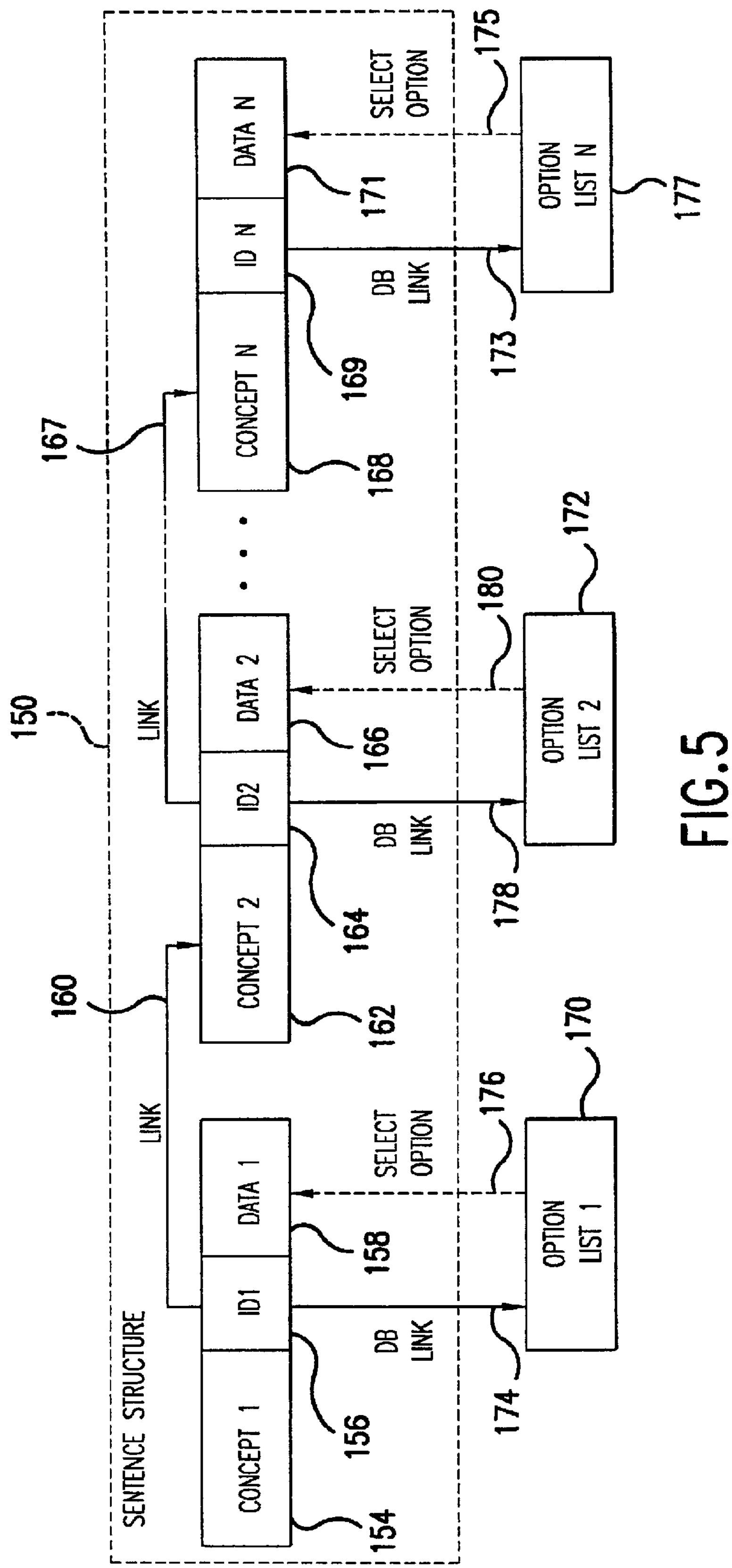
FIG. 5 is a diagram generally illustrating a sentence structure using concepts and associated concept identifiers to link concept data in order respond to a user request for service.

FIG. 5 is a diagram generally illustrating a sentence structure 150 using concepts and associated concept identifiers to link concept data in order respond to a user request for service. Sentence structure 150 includes a plurality of concepts 154, 162, and 168. Each concept includes an associated concept identifier: concept 154 includes a concept identifier 156; concept 162 includes a concept identifier 164; and concept 168 includes a concept identifier 169. Each concept identifier, as shown, can be linked with the next concept for logically building a sentence. For example, concept identifier 156 is linked (160) with concept 162, and concept identifier 164 is linked (167) with concept 168.

Each concept is also associated with data for use in constructing variations of the sentence. Concept 154 includes associated data 158, concept 162 includes associated data 166, and concept 168 includes associated data 171. Also, each concept through its concept identifier can be linked with an option list for filling in the associated data. Concept identifier 156 is linked (174) with option list 170; concept identifier 164 is linked (178) with option list 172; and concept identifier 169 is linked (173) with option list 175. Data can be selected, as illustrated by option links 176, 180, and 175, to fill in data for the associated concept. A database structure for the linking of concepts and option lists through concept identifiers is further explained in the related applications identified above.

Figure 6:
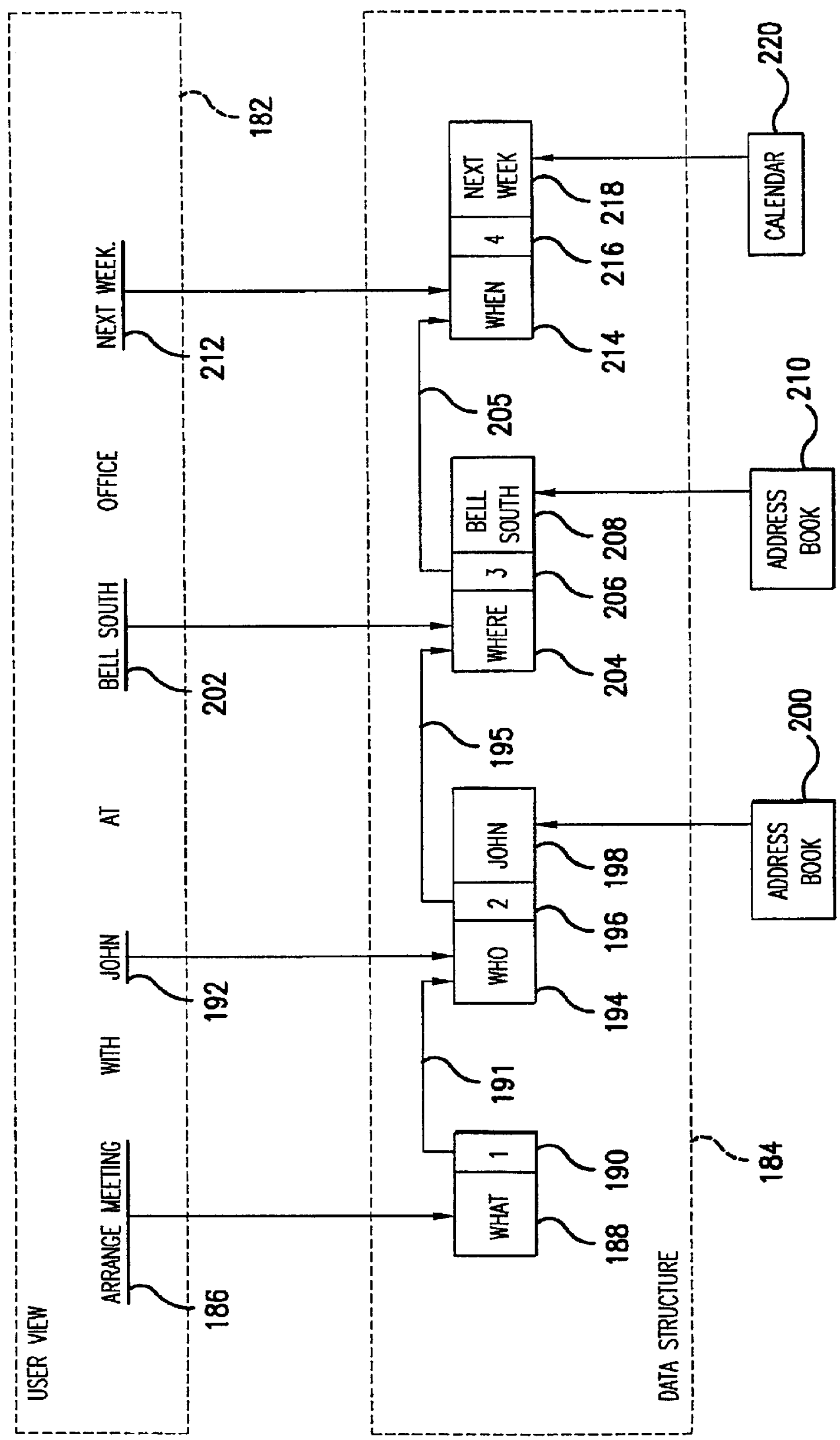
FIG. 6 is an example of linking concepts using the sentence structure shown in FIG. 5.

FIG. 6 is an example of linking concepts using the sentence structure shown in FIG. 5. A user view 182 illustrates a sentence as displayed in text to a user on a user device such as on a display screen or panel on the exemplary user devices identified above. A data structure 184 illustrates the corresponding links and structure stored in the concept database. The first concept 188 ("what") involves an initial prompt and, in this example, the "what" concept involves arranging a meeting (186). Concept 188 includes an associated concept identifier 190, and that concept identifier is linked (191) with the next concept 194 ("who") for this initial concept of arranging a meeting. Therefore, when a user selects the concept of arranging a meeting, the system server, such as system server 10, determines through link 191 that it should next query the user to determine who will attend the meeting.

In this example, concept 194 includes associated data 198 for a meeting with "John" and the corresponding data 192 is displayed to the user. Concept 194 includes an associated concept identifier 196. In order to determine an option list for the "who" concept 194, concept identifier 196 is linked with an electronic address book 200 for use in retrieving and presenting names to the user as options for the corresponding concept data.

Concept identifier 196 is linked (195) with the next concept 204 ("where") for this request, involving selecting a location for the meeting. The "where" concept 204 includes a concept identifier 206, which can be linked with an electronic address book 210 for presenting to the user locations as the option list for the corresponding concept data. In this example, a user has selected "Bell South" as the concept data 208, and that data is also displayed to the user as data 202. Finally, concept identifier 206 is linked (205) with the next concept 214 ("when") for this request, involving selecting a time for the meeting. The "when" concept 214 includes an associated concept identifier 216, which can be linked with an electronic calendar 220 for displaying to the user various dates and times as the option list for the corresponding concept data. In this example, the user has selected "next week" as the concept data 218, and that data is displayed to the user as data 212.

Therefore, the basic structure for constructing a sentence involves use of linked concepts, each concept having a concept identifier and concept data. The concept identifiers are used to create the data structure links and can be used with pointers or any type of electronic linking of information. Certain concepts, such as the initial prompt, do not necessarily include associated concept data. The concept identifiers can be implemented with any information for uniquely identifying a corresponding concept. They are shown as sequential numbers in this example for illustrative purposes only. Also, each concept can be associated with a concept class to further structure the linking of concepts.

In the user view, the concepts for selection can be indicated through visual formatting. In this example, each concept is shown as underlined. They can also be indicated with boxes, shading, different colors, symbols, or any visual formatting identifying them. Therefore, the user has a visual indication of each concept and can select them to dynamically change a sentence. For example, once the sentence in user view 182 is complete, or during construction of it, a user may go back and select a previous concept for which data was already entered. A user can select a displayed representation of a concept by, for example, tapping on the displayed text through a touch-screen or by entering a keyed or spoken command.

Upon selection of the representation of that concept, the system server can user the concept identifier to retrieve the option list, permit the user to select new data from the option list, and insert the new data in the sentence. The system server determines where to insert the data through the linking of the concepts with concept identifiers. For example, the system server determines that the "who" concept data is inserted in the sentence between the "what" and "where" concepts. The term "hypertext concepts" refers to the linking of concepts with concept identifiers and for use in linking related concepts.

Figure 7:
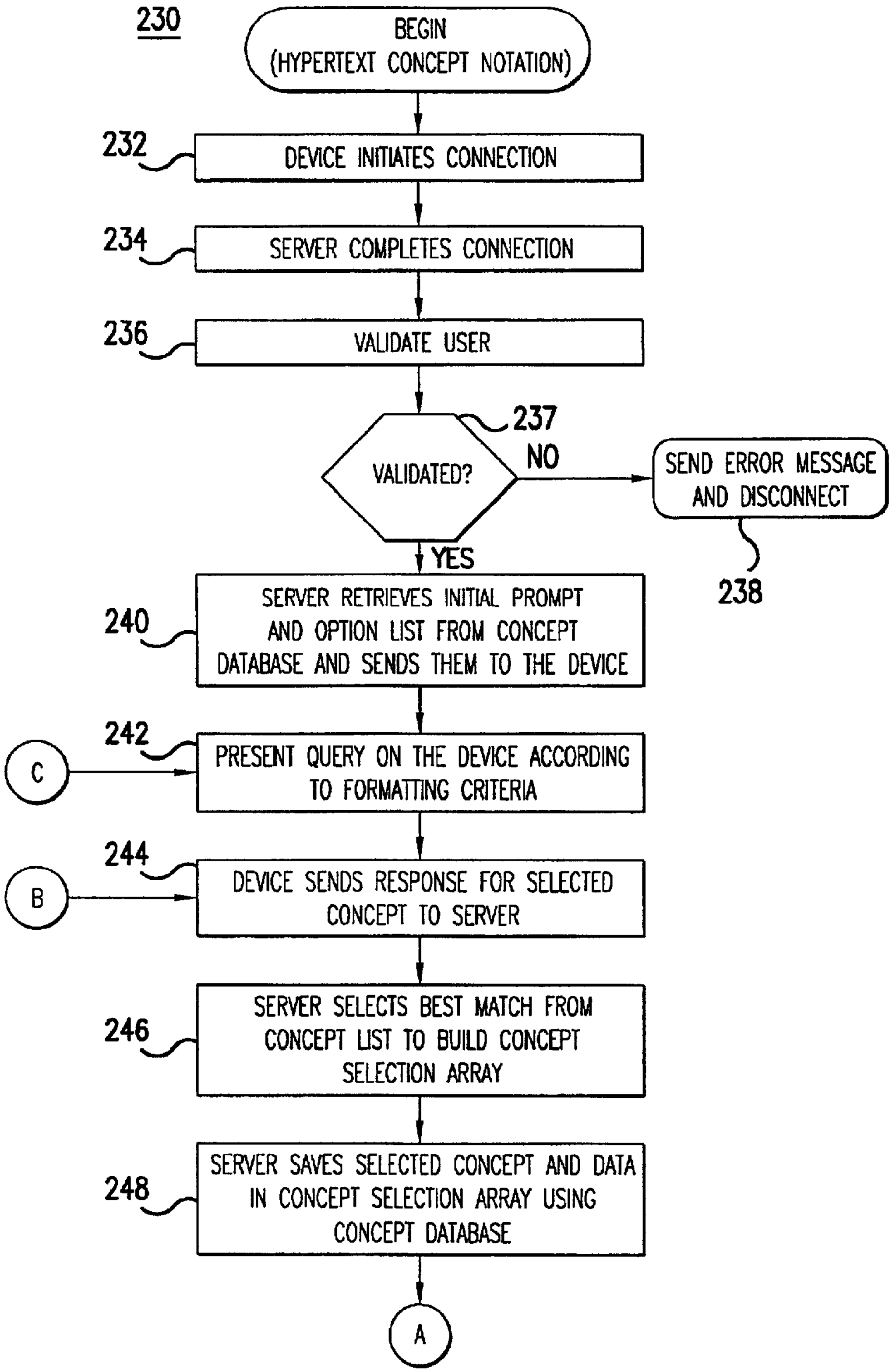
FIGS. 7 and 8 are flow chart of a method for hypertext concept notation to dynamically construct a sentence based upon concepts in order to respond to a user request for service.
Figure 8:
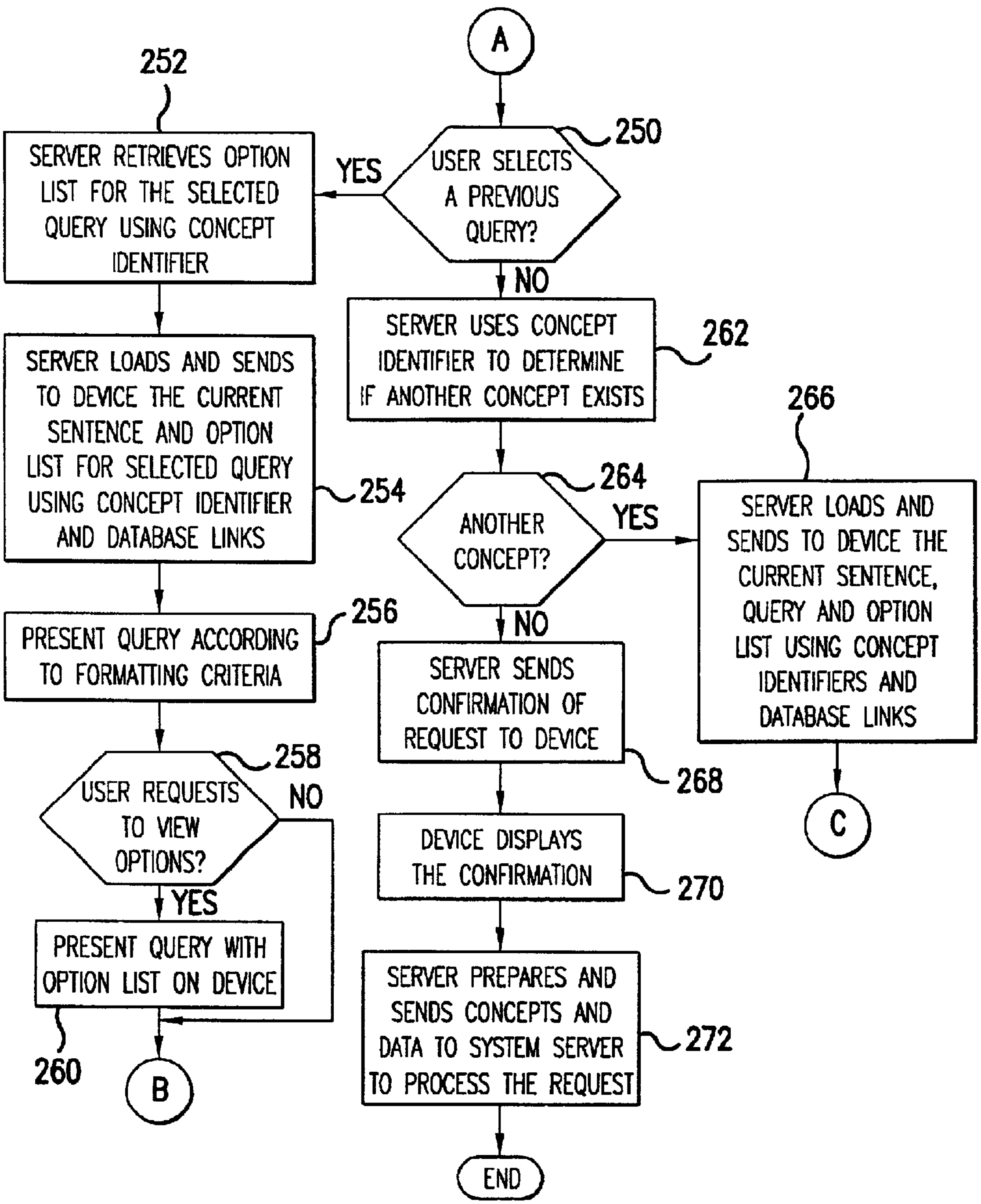

FIGS. 7 and 8 are a flow chart of a method 230 for hypertext concept notation to dynamically construct a sentence based upon concepts to respond to a user request for service, as illustrated in FIGS. 5 and 6. Method 230 can be implemented, for example, with software or firmware modules on a server such as system server 10 and the user device, as necessary to perform the method. In method 230, a device first initiates a connection over the network (step 232), and the server completes the connection (step 234). The term "device" includes wireless and wireline devices as explained above. The term "server" includes, for example, system server 10 and potentially speech processor 66 for voice recognition and text conversion features. The network for communication can include any of the networks explained above.

The server attempts to validate the user (step 236) and determines whether the user is properly validated (step 237). Validation is used to identify an authorized user and, for example, retrieve the user's preferences from personal data 38. It can occur in a variety of ways such as through use of a caller ID feature to link the user's phone number with his or her account in a database, by having the user enter a code or password and linking that information with the user's account in the database, or through a voice print technique used to electronically record the user's voice and attempt to match it with prerecorded voice prints in the database.

If the user is not properly validated, the server typically sends an error message and disconnects with the user's device (step 238). If the user is validated, the server retrieves an initial prompt and option list from the concept database and sends them to the device (step 240). An initial prompt is used to determine the type service requested; for example, the server may ask if the user wants to arrange a meeting, obtain information, order goods or services, or make a reservation. An exemplary concept database, initial prompt, and option list are explained in the web-based personal assistance applications identified above.

The server transmits the query for display on the user's device according to formatting criteria (step 242). The formatting criteria can involve, for example, how to visually indicate or represent the concepts for selection. The device receives a response from the user, involving selection of a concept or data for the a concept, and sends the response to the server, such as through a key pad input or selection on a display panel (step 244). In addition to keyed input, the server can receive and process a voice input through voice-to-concept conversion techniques as described in the related application identified above.

The server selects the best match from the concept list to build the concept selection array (step 246). The server can use, for example, artificial intelligence or heuristic techniques to implement the user preferences for building the array. The server also saves the selected concept and data in the concept selection array using the concept database (step 248). The process of selecting a best match and building the array is further explained in the web-based personal assistance applications identified above.

The server determines if the user selected a previous query or representation of a concept in the sentence (step 250). A previous query involves a query for which the user already entered data during construction of the sentence. A user can select a query, for example, as identified above by selecting the displayed text through a touch-screen or a keyed or spoken command. The representations of the concepts can be identified through visual formatting such as the underlining shown in FIG. 6; thus, the user is provided with a visual indication of the concepts available for selection.

If the user selected a previous query, the server retrieves the option list for the selected query using the associated concept identifier (step 252). If the previous query selected is the initial prompt, the server can retrieve a list of concepts or initial prompts as the option list. The server loads and sends to the device the current sentence and option list for the selected query (step 254). The query can include a text fragment relating to the concept as determined through the concept identifier links. The concept thus is an abstraction. The text fragment embodies the concept and provides a way to query the user for a response to the concept. The text fragment can be retrieved from the concept database using the concept identifier for the next concept. Concept identifiers are also referred to as concept codes.

The server presents the query according to the formatting criteria (step 256) and determines if the user wants to view the option list (step 258). If so, the device presents the query and option list (step 260). The device can be programmed to automatically or by default present the option list for each query. The method then returns to step 244 to receive and process the response to the query.

If the user had not selected a previous query, as determined in step 250, the server uses the concept identifier and linking to determine if another concept exists for constructing the sentence (step 262). If another concept exists (step 264), the server loads and sends to the device the current sentence, query, and option list for the next concept (step 166) and returns to step 242 to present the query and potentially the option list, and process the response.

When no more concepts exist, meaning that the server has the information required from the user to process the request, the server sends confirmation of the request to the device (step 268) and the device displays the confirmation (step 270). The confirmation can be implemented using, for example, a textual sentence displayed to the user on the user's device and containing the complete request as determined through the queries and user's responses. The confirmation thus can include the sentence in a completed state embodying the information required to respond to a request. It can also include a sentence in a current state having a sub-set of the information required to respond to the request. The current state of the sentence is often displayed during the process of querying and gathering information to respond to the request.

The server also prepares and sends the concepts and data to a system server to process the request (step 272), and that processing can occur as explained, for example, in the web-based personal assistance applications identified above. If voice recognition were used, speech processor 66 performs the voice conversion and step 272 involves transmitting the corresponding concepts and data to system server 76 via interface server 68.

While the present invention has been described in connection with an exemplary embodiment, it will be understood that many modifications will be readily apparent to those skilled in the art, and this application is intended to cover any adaptations or variations thereof. For example, various types of user devices, hardware components for the devices and servers, and types of network transmissions may be used without departing from the scope of the invention. This invention should be limited only by the claims and equivalents thereof.

What is claimed is:

1. A computing device for dynamically constructing a sentence relating to a user request, comprising:

a receive module, of the computing device, for receiving an indication of concepts from a user;

a select module, of the computing device, for selecting related queries to present to the user based upon the concepts; and a repeat module, of the computing device, for selectively initiating the select module, based upon user input, in order to dynamically change the sentence.

2. The computing device of claim 1, wherein the receive module includes a module for receiving a selection of one or more presented representations of the concepts.

3. The computing device of claim 1, further including a module, of the computing device, for linking each of the concepts with corresponding concept identifiers and concept data.

4. The computing device of claim 3, further including a module, of the computing device, for using the concept identifiers to link and determine the related queries.

5. The computing device of claim 4, wherein the repeat module includes a module for using the concept identifiers to determine a new query to dynamically change the sentence.

6. The computing device of claim 5, wherein the repeat module includes:

a module for receiving an indication of a new concept in response to the new query; and a module for using the concept identifiers to determine where to insert the new concept in the sentence.

7. The computing device of claim 1, further including a presentation module, of the computing device, for presenting to the user the queries as representations of the concepts in order to construct the sentence.

8. The computing device of claim 1, further including a module, of the computing device, for presenting the sentence to the user.

9. The computing device of claim 8, further including a module, of the computing device, for providing an indication of concepts in the presented sentence that can by dynamically changed.

10. The computing device of claim 8, further including a module, of the computing device, for presenting the sentence with variable types of formatting.

11. The computing device of claim 3, further including a module, of the computing device, for linking the concept data with corresponding information in a database.

12. The computing device of claim 1, further including a module, of the computing device, for associating each of the concepts with a concept class.

13. The computing device of claim 7, wherein:

the receive module includes a module for receiving selection one of the presented queries; and the presentation module includes a module for presenting a plurality of items as possible responses to the concept corresponding to the presented query.

14. A computing device implemented method for dynamically constructing a sentence relating to a user request, comprising:

receiving by a computing device, an indication of concepts from a user;

selecting by the computing device, related queries to present to the user based upon the concepts;

using by the computing device, the concepts to construct a sentence relating to the user request; and selectively repeating by the computing device, the selection of related queries, based upon user input, in order to dynamically change the sentence.

15. The method of claim 14, wherein the receiving by a computing device, an indication of concepts, includes receiving selection of one or more presented representations of the concepts.

16. The method of claim 14, further including linking by the computing device, each of the concepts with corresponding concept identifiers and concept data.

17. The method of claim 16, further including using by the computing device, the concept identifiers to link and determine the related queries.

18. The method of claim 17, wherein the selectively repeating by the computing device, the selection of related queries, includes using by the computing device, the concept identifiers to determine a new query to dynamically change the sentence.

19. The method claim 18, wherein the selectively repeating by the computing device, the selection of related queries further includes:

receiving by the computing device, an indication of a new concept in response to the new query; and using by the computing device, the concept identifiers to determine where to insert the new concept in the sentence.

20. The method of claim 14, further including presenting to the user, by the computing device, the queries as representations of the concepts in order to construct the sentence.

21. The method of claim 14, further including presenting the sentence, by the computing device, to the user.

22. The method of claim 21, further including providing by the computing device, an indication of concepts in the presented sentence that can be dynamically changed.

23. The method of claim 22, further including presenting by the computing device, the sentence with variable types of formatting.

24. The method of claim 16, further including linking by the computing device, the concept data with corresponding information in a database.

25. The method of claim 14, further including associating by the computing device, each of the concepts with a concept class.

26. The method of claim 20, wherein:

the receiving by a computing device, an indication of concepts, includes receiving by the computing device, selection one of the presented queries; and presenting to the user, by the computing device, the queries includes presenting a plurality of items as possible responses to the concept corresponding to the presented query.

* * * * *